United States Patent [19]

Giguere

[11] 4,424,081
[45] Jan. 3, 1984

[54] RECONDITIONING SOILS CONTAMINATED BY CRUDE OILS OR OTHER REFINED PETROLEUM PRODUCTS

[76] Inventor: Marcel L. Giguere, 8255 rue Renard, Brossard, Quebec, Canada, J4X 1R6

[21] Appl. No.: 341,824

[22] Filed: Jan. 22, 1982

Related U.S. Application Data

[62] Division of Ser. No. 155,190, Jun. 2, 1980, Pat. No. 4,336,136.

[51] Int. Cl.³ ............................................... B08B 3/04
[52] U.S. Cl. .................................... 134/10; 134/25.1; 134/40; 175/206
[58] Field of Search ......................... 134/40, 25.1, 10; 175/206, 207

[56] References Cited

U.S. PATENT DOCUMENTS

| | | | |
|---|---|---|---|
| 1,580,723 | 4/1926 | Hapgood | 134/25.1 X |
| 3,802,916 | 4/1974 | Jackson | 134/25.1 X |
| 4,072,539 | 2/1978 | Benzon | 134/25.1 |
| 4,136,217 | 1/1979 | Henley | 134/40 X |
| 4,175,039 | 11/1979 | Fisher | 134/10 X |
| 4,184,891 | 1/1980 | Pollozec | 134/10 |
| 4,206,001 | 6/1980 | Knowlton | 134/26 X |
| 4,233,174 | 11/1980 | Sheridan | 134/40 X |
| 4,324,652 | 4/1982 | Hack | 134/25.1 X |

FOREIGN PATENT DOCUMENTS 2724271 12/1978 Fed. Rep. of Germany.

OTHER PUBLICATIONS

Chemical Abstracts, 90:92006r, (1979).

Primary Examiner—Sidney Marantz
Attorney, Agent, or Firm—Oblon, Fisher, Spivak, McClelland & Maier

[57] ABSTRACT

A method for reconditioning soils contaminated with crude oils or other refined petroleum products. The system comprises a mixer input device for mixing and heating the soils with a liquid and providing a heated blended slurry. A sparger kiln agitates the slurry to break down its component parts into a fine particle slurry. A first clarifier washes the fine particle slurry to effect a first separation of oil particles from the slurry. A network of flotation cell units further wash and agitate the fine particle slurry from the clarifier to effect a second separation of oil particles from the fine particle slurry. A reagent is added to the flotation cells to effect the oil separation. An aeration clarifier further separates the oil particles from the liquid mixture elected from the flotation cell units. A collecting system is provided to recover the oil particles separated from the first clarifier and the aeration clarifier.

7 Claims, 5 Drawing Figures

4,424,081

RECONDITIONING SOILS CONTAMINATED BY CRUDE OILS OR OTHER REFINED PETROLEUM PRODUCTS

This is a divisional application of application Ser. No. 155,190 filed June 2, 1980 and issued on June 22, 1982 as U.S. Pat. No. 4,336,136.

BACKGROUND OF INVENTION (a) Field of the Invention

The present invention relates to a method for reconditioning soils contaminated by heavy crude, refined petroleum and/or chemical products derived from similar sources.

(b) Description of Prior Art

With the escalation cost of oil and strict government regulations concerning the disposal of contaminants, there exists a need to provide a system which can recondition contaminated soils to extract therefrom oil particles or other mineral particles that may be re-used and further to obtain an end product which may be conveniently disposed of without contaminating the environment. Environmental problems are numerous in the areas occupied by oil and petrochemical refineries. Most refineries have a common complex problem, that being, the disposal of contaminated soils during the construction phase as well as the disposal of material presently stored in open sludge lagoons containing off-spec material, sludge from tank cleaning, or filter process clays discharged during regular refinery processing. Another need is to process soils from oil-impregnated shore lines resulting from tanker oil spills or spills from other types of vessels or even chemical discharge into water effluents such as rivers.

SUMMARY OF INVENTION

It is a feature of the present invention to provide a method for reconditioning soils contaminated with crude oils or other refined petroleum products and which substantially overcomes the above-mentioned disadvantages.

It is a feature of the present invention to provide a method for reconditioning soils contaminated with crude oils or other refined petroleum products and wherein the system is capable of separating the liquids as well as the solid contaminants of different atomic weights.

Another feature of the present invention is to provide a method of reconditioning soils contaminated with crude oils or other refined petroleum products which will not cause any pollution to the environment.

According to a further feature of the present invention, there is provided a method of reconditioning soils contaminated with crude oils or other refined petroleum products to separate constituent parts of the soils. The method comprises mixing and heating the soils with a liquid to provide a heated blended slurry. The blended slurry is further agitated and heated to provide a fine particles slurry. The fine particles slurry is washed to effect a first separation of oil particles from the slurry. The remaining slurry is still further washed in flotation cell units to effect a second separation of oil particles from the fine particle slurry and the liquid mixture containing the oil particles is collected. The collected liquid mixture is then subjected to an aeration clarifier action for separating the oil particles from the mixture. The separated oil particles from the first washing step and the aeration clarifier are then collected.

BRIEF DESCRIPTION OF DRAWINGS

A preferred embodiment of the present invention will now be described with reference to the example thereof illustrated in the accompanying drawings, in which.

Figure 1:
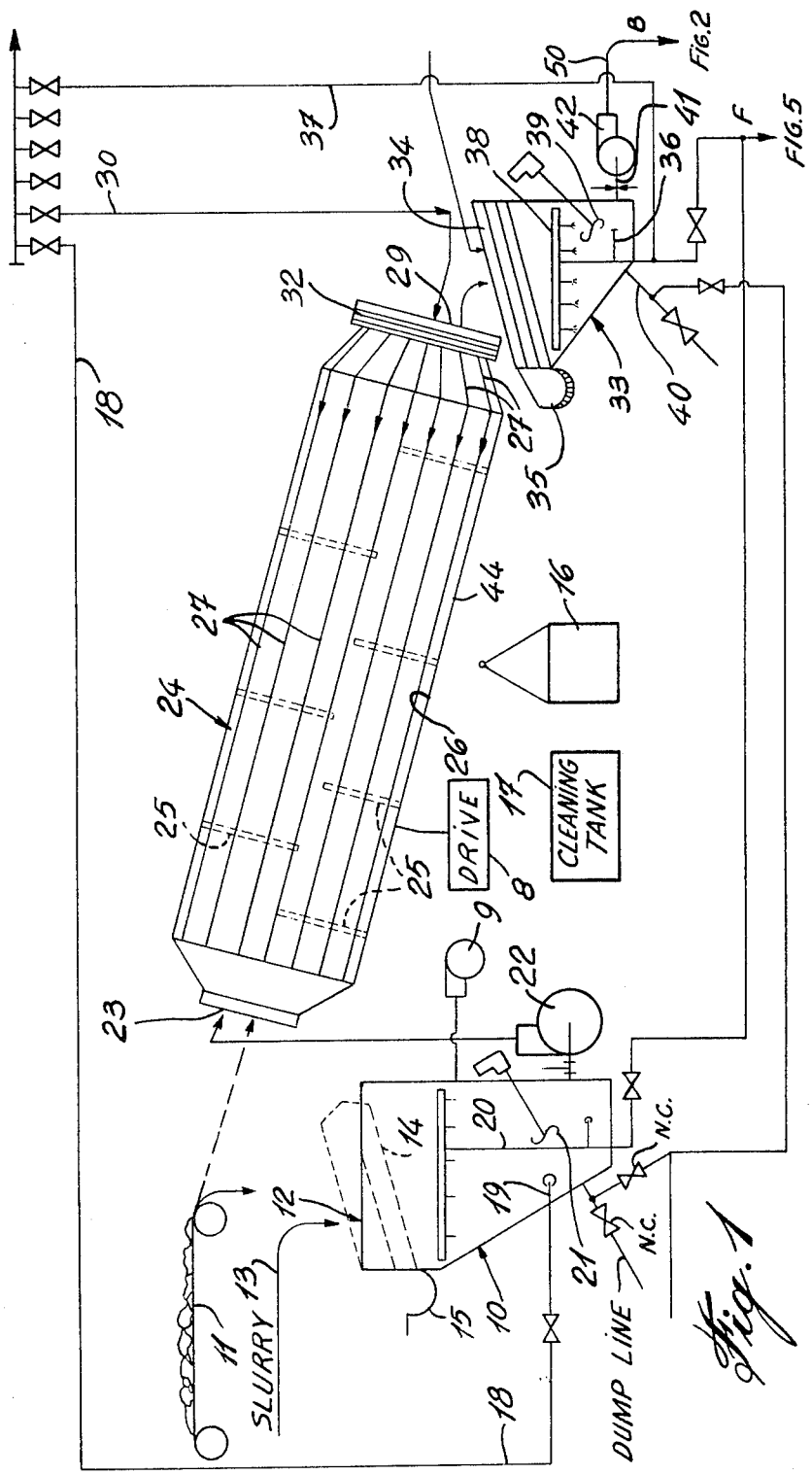
FIG. 1 is a schematic diagram of part of the system of the present invention and illustrates the mixer input heat sump and the sparger kiln.

It is pointed out that the letters, A, B, C, C', E, G, H, I, J, K, L as used in the drawings designate the corresponding connection of certain of the lines between the Figures to facilitate interconnecting the various sections of the entire system.

DESCRIPTION OF PREFERRED EMBODIMENTS

Referring to the drawings, there is shown the system of the present invention for processing soils contaminated with crude oils or other refined petroleum products. The treatment process and its operation will now be described in detail with reference to FIGS. 1 to 5 representative of parts of the whole system. With reference now to FIG. 1, the raw materials may be received in a slurry form or in a dry state as would be derived from an excavated area. These materials are stored in dry stockpiles or storage lagoons lined with suitable material to prevent contamination of environmental soils. A feed conveyor 11 and a conduit feed line 13 feed the dry and slurry products, respectively, to a feed sump 10. Of course, both these feeds may be operated independently or simultaneously. The top inlet end 12 of the feed sump is provided with a filter screen 14 which is mechanically agitated to remove rocks or large foreign objects mixed in with the dry or slurry material and that would damage the pump 22. These extracted materials are conveyed by the conveyor 15 to a cleaning device, such as a screen basket 16 which will then be dipped into a reservoir 17 containing a cleaning solvent therein to remove oil deposits on the particles of material deposited therein.

The purpose of the feed sump 10 is to maintain the material in a slurry form and at the same time raise the temperature thereof to approximately 140° F. To this end, there is provided a steam release nozzle 19 which is connected to a steam conduit 18 which releases steam within the slurry.

A boiler 31 provides the steam for the entire system and it is implemented by storage reservoirs 31' connected to convenient water supplies 31".

A water inlet 20 provides a desired supply of water to the soils and these are mixed by the mixer head 21. The feed of the dry or wet slurry is effected during a mixing cycle period during which there is added to it sodium hydroxide by suitable means such as chemical pump 9. The ratio of solid/water is 20% solids and 80% water. A cycle usually delivers 5 tons of sludge to the feed sump 10 and to it is added fourteen ounces of sodium hydroxide. This sodium hydroxide will create a shock treatment to the sludge to prepare it for later separation of its contaminants.

At the end of the mixing cycle, the slurry is pumped out of the feed sump 10 by means of pump 22 and directed to the inlet end 23 of a sparger kiln 24. The kiln 24 is an inclined cylindrical housing 44 rotatable on its long axis by suitable drive means 8 and is provided with a plurality of segmented internal baffles 25 offset from one another and extending from the inner periphery 26 of the kiln. The baffles 25 agitate the slurry during its travel down the kiln. A plurality of steam pipes 27 are disposed in the inner periphery 26 of the kiln and extend longitudinally therealong. The pipes are provided with a plurality of orifices, therein 60 jet nozzles (not shown) per pipe to release steam into the slurry to heat the slurry as it is agitated during its travel from the inlet end 23 to the outlet end 29 of the kiln. The steam pipes 27 are supplemented by a multiport steam valve 32 associated with the kiln 24 and fed by steam conduit 30.

As the slurry enters the kiln, it is restricted by the baffles and broken down and undergoes a steam bath as it travels towards the outlet end of the kiln. Cutters and other grinding elements (not shown) also assist to further break down the soils. The kiln is rotated at a speed of 1 rpm whereby 67% of the solid will pass through a minimum of eight baffles 25. The agitation and the steam subjected to the slurry causes a break-down of the slurry content into fine particles, thus liberating entrained contaminants. Simultaneously with the feed of the slurry at the inlet end 23 of the kiln, a caustic liquid is injected into the slurry by means of a spray nozzle (not shown). The caustic liquid helps in the extraction of the contaminants from the slurry during the agitation process as it goes through the kiln.

Previously, we stated that the kiln rotates at a speed of 1 rpm. The descent time of the slurry from the inlet end 23 to the outlet end 29 is approximately eight minutes. Thus, the kiln will rotate eight times during the dull cycle of treatment of the slurry. As the slurry travels throughout the kiln, it is also heated by the steam and its temperature at the outlet end 29 is approximately 210° F. The slurry is discharged at the outlet end 29 onto a discharge sump 33.

This discharge sump 33 is constructed substantially the same as the feed sump 10 and contains an inlet screen 34 which separates the large particles still remaining in the slurry and gravity feeds them by vibrating the screen onto the conveyor 35 which again feeds these particles to the basket 16. A water line 36 also feeds more water to the slurry and a vapor line 37 connects to a vapor nozzle arrangement 38 to feed steam into the slurry to maintain its approximate desired temperature. A mixer head 39 maintains the slurry in an aqueous state. A drain conduit 40 is provided for cleaning purposes.

The slurry at the oulet 41 of the discharge sump 33 is pumped by pump 42 at a high velocity through conduit 50 into a clarifier 43.

Figure 2:
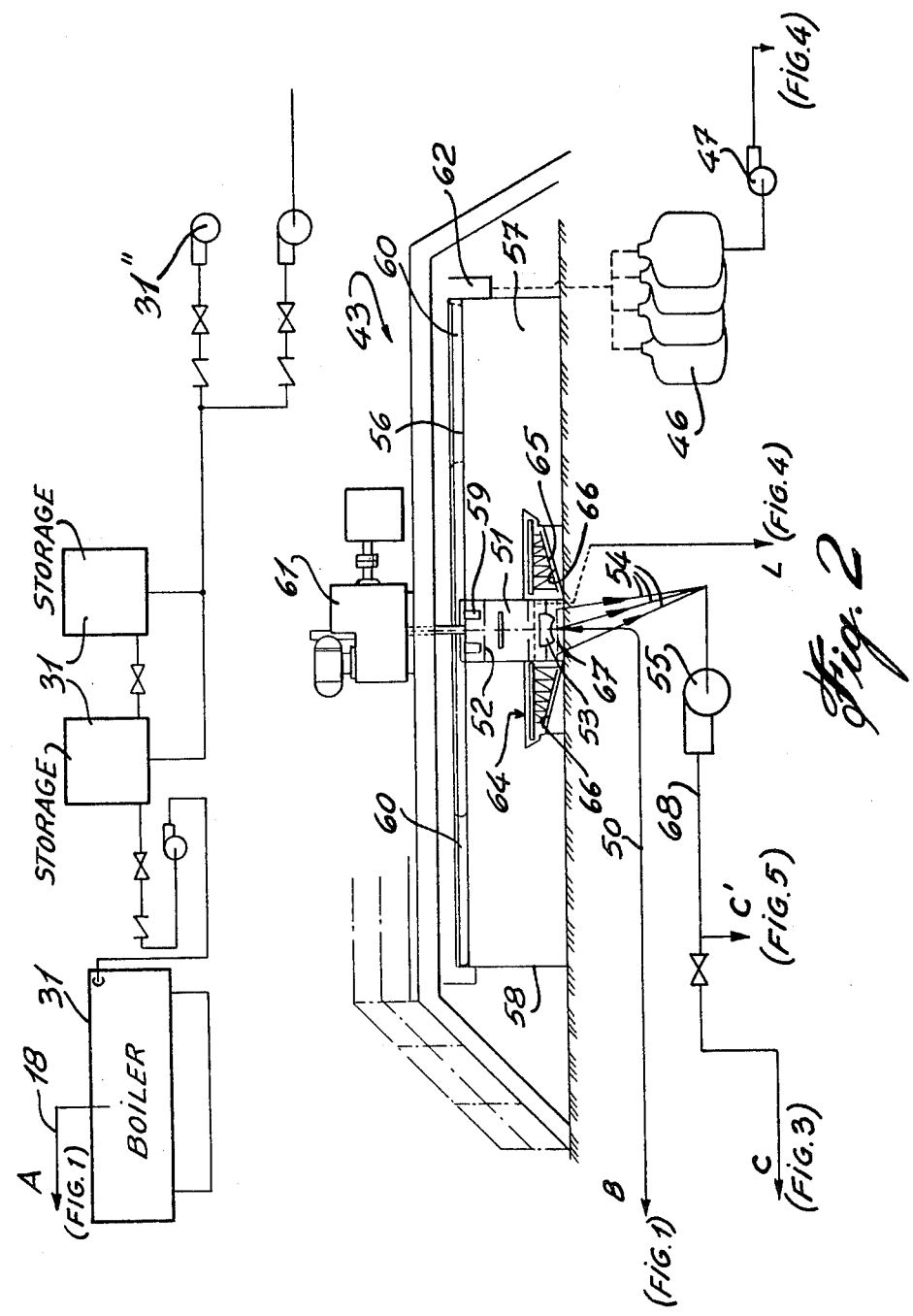
FIG. 2 is a schematic diagram of still a further part of the system illustrating schematically the construction of the first clarifier.

As shown in FIG. 2, the slurry feed line 50 connects to the center of a main separating well 51 which is a cylindrical chamber. The discharge of the slurry is located at the center of the separating well 51 which chamber causes the slurry to be washed at a high velocity. As the slurry is released upwardly in the well 51, it strikes a number of restricting baffles 52 which cause the heavier particles, still contained within the slurry, to fall within a collector cone 53 located towards the bottom of the separating chamber and at the center thereof. This cone feeds these particles by means of conduit 54 to a feed sump pump 55 which supplements flotation cells, which will be described later.

Air and steam is injected into the main separating well 51 to help wash and break up the very small particles of silt which form approximately 60% of the slurry. The foam and air bubbles escaping upward in the separating chamber 51 will carry the majority of the oil away from the slurry. The liberated oils will now escape to the surface 56 of the water 57 contained within the clarifier main water reservoir 58. This water 57 provides the means of collecting the oil which is separated in the separating chamber 51. The liberated oils now escape to this surface 56 through the outlet end 58 of the chamber 51 and through a plurality of ports 59 located circumferentially about the chamber 51 in the upper portion thereof. This floating oil is raked by scraper arms 60 which extend radially from a center drive 61 to discharge the floating oil into a circumferential collecting channel 62 provided about the upper peripheral portion of the chamber 58. The oil in the collecting channel 62 is conveyed to a holding reservoir 63. Intermediate collecting vessels 46 may be fed directly from the channel 62 and its contents periodically pumped by pump 47 to the reservoir 63.

As previously described, the sludge is released under pressure from the bottom of the main separating chamber and it is directed against a plurality of baffles 52. These baffles prevent all solid particles contained in the sludge from being released to the surface of the water in the reservoir. The particles then fall by gravity and are collected in the cone 53. However, some of the finer particles are released through the ports 59 and these fall by gravity through the water 57 and are collected in a circumferential solids sump collector 64 which is provided with a plurality of scrapers 65 located adjacent a conical bottom wall 66 thereof whereby to scrape the particles towards the center where there is provided a sump pump collector 67 where the feed lines 54 are connected to for conveying the collected slurry to the feed sump pump 55 where it is then pumped to the flotation cells 70. At this stage, there remains approximately 30% of the total oil to be removed in the slurry.

Figure 3:
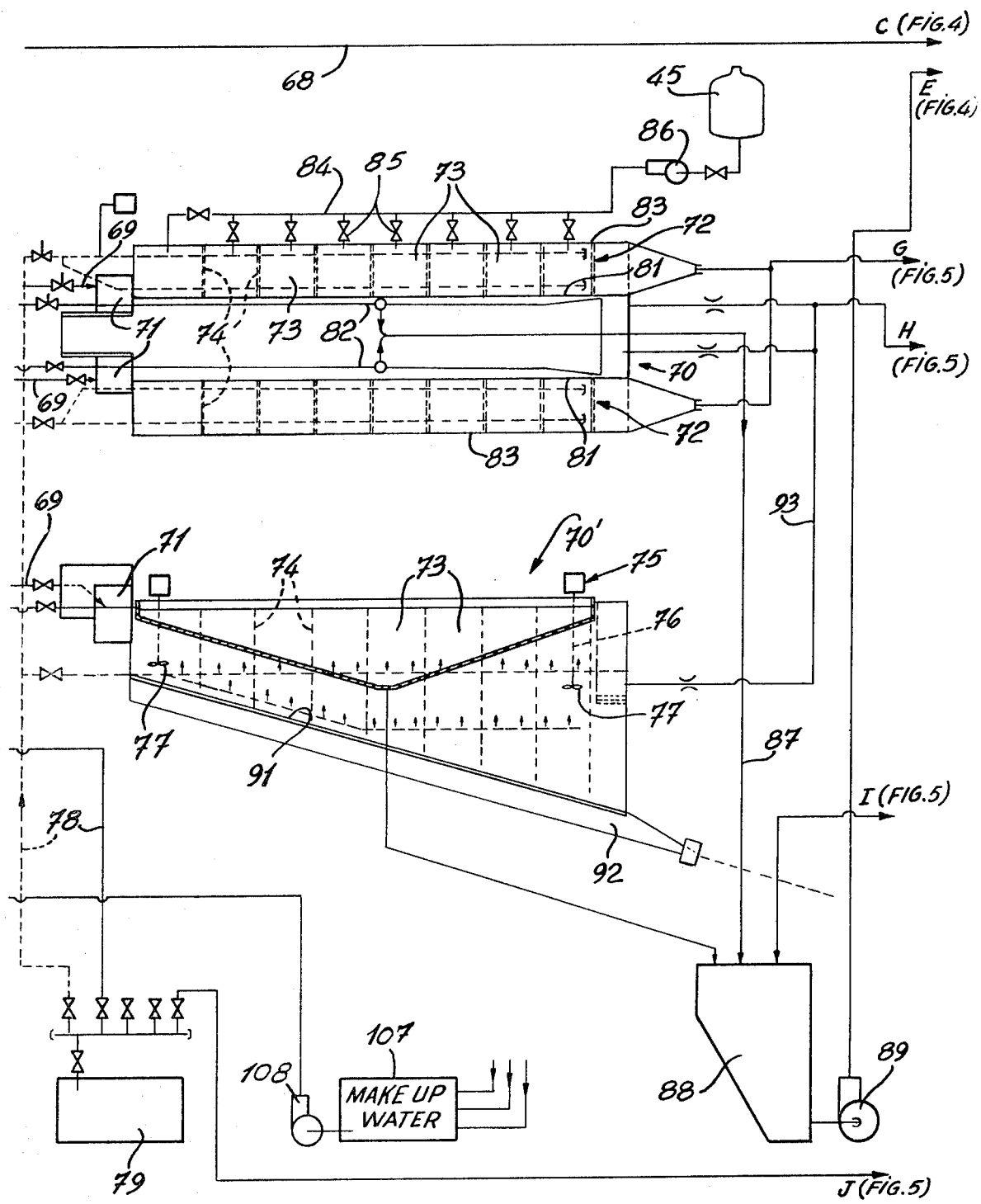
FIG. 3 is a schematic diagram of a still further part of the system illustrating schematically and showing a top and side view of the flotation cell units.

Referring additionally to FIG. 3, the outlet conduit 68 from the feed sump pump 55 is fed to discharge the slurry at a discharge end 69 into a distribution receiver 71. The flotation cells consist of four flotation units 72, two only being shown in this drawing, and each consisting of having six major cells 73. In the drawing, two flotation units 72 are shown from a top view and a side view thereof is also illustrated at 70' whereby to better illustrate the operation of the flotation cells.

As shown in the illustration designated by numeral 70', the slurry in the distribution receiver 71 feeds the cells 73 from underneath through baffles 74. Each cell 73 is provided with an agitator 75 which consists of a motor driven shaft 76 having a plurality of agitating blades 77. As the depth of the cell increases, there are more agitating blades along the length of the shaft 76.

Air is also injected into the distribution receiver 71 via a distribution conduit 78 which is connected to an air compressor 79. Harmless chemicals are also added to the distribution receiver 71 to obtain a controlled froth on the surface of the slurry within the cell 73 whereby to capture the very small particles of oil. This froth is broken down by a jet spray of water provided in the water lines (not shown) disposed adjacent the overflow edge 81 and on top of a collecting trough 82 associated with each flotation unit 72. The outer edges 83 of each flotation unit 72 is of a higher elevation than the inner edge 82 to prevent overflow.

As previously described, chemicals are added to the slurry in order to obtain the froth and this is done by means of a reagent feed line 84 having a plurality of drip valves 85 associated with each of the cells 73. The reagent feed line 84 is supplemented by a reagent tank 45 containing the reagent chemical therein and a drip pump 86 pumping the reagent at very low pressure. The reagent chemical comprises fatty acids or alcohols such as cresyli acids, eucalyptus oils, pine oils, alkyl ethers, phenyl ethers of propylene, polypropylene or glycols. This reagent, when mixed with the slurry, forms a foam to which the oil particles adhere to and floats off the overflow edge 81 where it is broken down by the jet sprays of the water line 80. The liquid mixture collected in the collecting trough 82 and comprising the reagent agent, the water from the water spray and the oil, is then fed by the outlet conduit 87 to an oil collecting sump 88. A pump 89 pumps the liquid from the sump 88 to a secondary lost aeration clarifier 90.

In the lower section of the flotation unit 72, a fine screen 91 is provided whereby to separate the slurry and stop the soil from being carried away with the froth. The screen 91 acts much the same as a trap and retains the soils in the bottom slurry launder 92 for transport and further processing of the soil if necessary.

Figure 4:
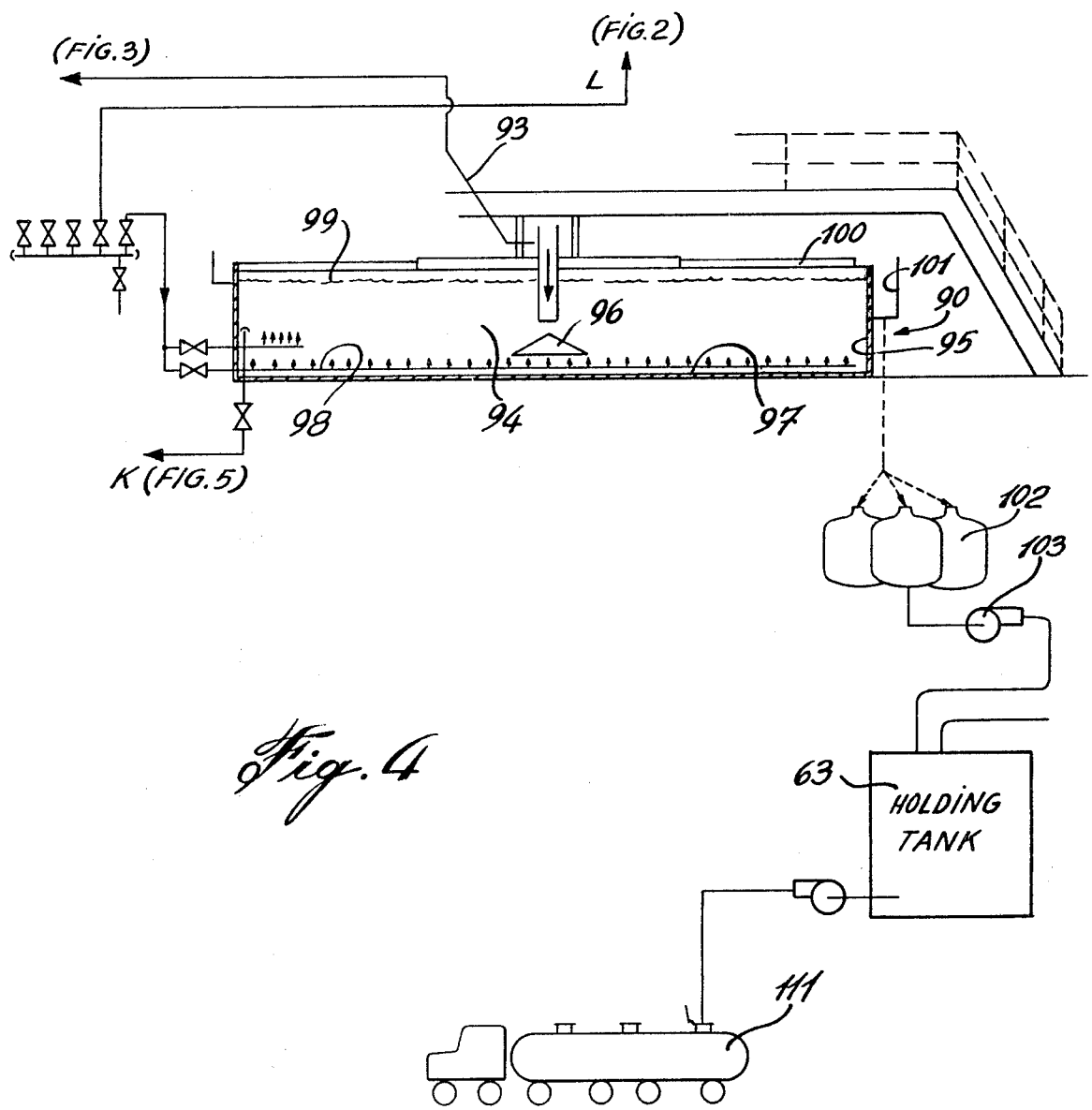
FIG. 4 is a schematic diagram illustrating a still further part of the system and showing schematically the construction of the aeration clarifier.

Referring to FIG. 4, the liquid from the oil collecting sump 88 which consists of the foam reagent, water and oil mixture, is pumped through the conduit 93 to the top center section of the last aeration clarifier 90 and released at a predetermined depth into the clear water content 94 of the clarifier chamber 95 and against a flow dispersing cone 96. Adjacent the bottom wall 97 of the chamber 95 or reservoir, there is disposed a plurality of air conduits 98 having a plurality of air conduits 98 having a plurality of air nozzles to release air streams up into the water 94. The air released by these jet streams breaks up the liquid mixture impinging against the inverted cone 96 and in turn carries the oil particles to the surface 99 of the water body 94. As the quantity of oil on the surface 99 increases in volume, it reaches the level of moving scrapers or rakes 100 and is deposited into a ring collection launder 101 disposed about the top peripheral portion of the reservoir 95. The oils collected from the launder 101 are then fed to a collecting vessel 102 which is pumped by means of pump 103 to the holding reservoir 63. At this stage of the system, most of the oil has been removed from the sludge fed into the input of the system, that is to say, fed into the feed sump 10.

Figure 5:
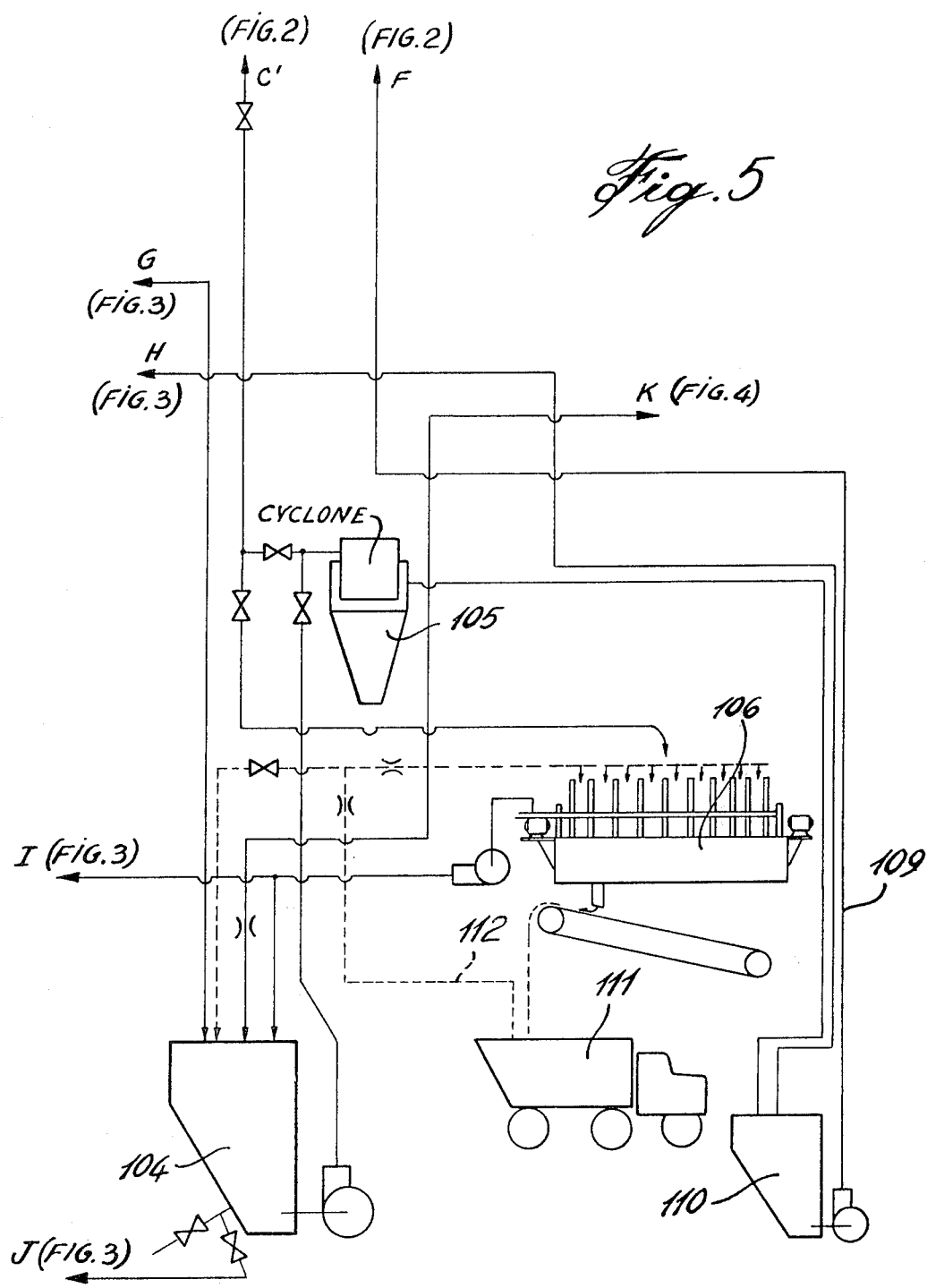
FIG. 5 is a schematic diagram of a still further part of the system illustrating schematically the collection systems for the collected sludge from the flotation cells and the collected water for recycling in the system.

As shown in FIGS. 4 and 5, the soils gathered in the slurry launder 92 at the bottom of the flotation cell 72 are fed to an underflow and sludge collector sump 104 where water is added to it in order to pump the resulting slurry at high velocities to a group of staged cyclones 105. This underflow, which consists of approximately 80% solids, is then fed to a clay filter and vacuum system 106 or may be fed direct through the outlet line 112 to a wet carrier or conveyor 111. The clay filter and vacuum system extracts most of the water and it is fed to the water collection sump 110.

The liquid at the outlet conduit 107 may also be fed to other flotation cells (not shown) for reprocessing the sludge residue whereby to extract therefrom any other particles or toxic materials and recovered for other uses. Such materials, for example, may react with liquids whereby to form toxic liquids or gases which are undesirable in the disposal of the residual sludge and which may have advantageous uses.

The residual product at the outlet of the clay filter and vacuum system 106 is stockpiled in a clean basin for natural air drying. The most common type of in-plant transportion for this type of material would be a stacker type conveyor, however, other methods are possible. This material, once dried, is now ready for use as back fill or for most any other type of use. The process water is also recovered for use in the initial stages of the process. As herein shown, the accumulation is made in the water storage reservoir 107. All recycled water is fed through this reservoir from the many input lines as herein shown, and notably, from the flotation unit 72, the discharge sump 33, and the last aeration clarifier 90. The water from the storage reservoir 107 is directed by the pump 108 back into the main recycled water line 109 which connects through various valves to the apparatus in the various stages of the process.

All of the minerals and toxic residues extracted from the residual slurry are then transported for disposal by regulatory means in compliance with environmental regulations. The oil contained in the holding reservoir 63 is transported by various means, such as oil tanker 111. This oil may be transported to refineries for reprocessing or could be sold for direct use without further refining.

The above-described apparatus and method provides a system whereby oil can be recovered from sludges by minimal use of energy. That is to say, the system does not include high pressure or temperature stages nor does it require expensive additives to effect the separation, Further, it is pointed out that the final residue at the output of the system, consists of a dry particle residue free of any acids and minerals. Therefore, this final residue could be used for land fill or other purposes without fear of contaminating the environment.

It is within the ambit of the present invention to cover any obvious modifications of the system hereinabove described, provided such modifications fall within the scope of the broad appended claims.

I claim:

1. A method of reconditioning soils contaminated with crude oils or other refined petroleum products to separate constituent parts of said soils, said method comprising the steps of,
    (i) mixing and heating said soils with a liquid to provide a heated blended slurry at an input stage,
    (ii) conveying said blended slurry to a sparger kiln of a further stage for further agitating and heating said blended slurry to provide a fine particle slurry,
    (iii) further conveying said fine particle slurry to another stage for washing said fine particle slurry to effect a first separation of oil particles from said slurry,
    (iv) further conveying said slurry to a further stage for further washing said slurry in flotation cell units to effect a second separation of oil particles from said fine particle slurry,
    (v) collecting said liquid mixture with said oil particles, (vi) further conveying said mixture to a still further stage for subjecting said collected liquid mixture to an aeration clarifier action for separating said oil particles from said mixture, (vii) collecting said oil particles recovered in steps (iii) and (vi), and (viii) collecting said mixture which has been substantially decontaminated from said oil and other contaminated materials for safe disposal thereof.

2. A method as claimed in claim 1 wherein after each said steps (i) and (ii), there is provided the steps of filtering large particles from said soils.

3. A method as claimed in claim 1 wherein said step (i) comprises adding sodium hydroxide to said blended slurry, said slurry being heated to approximately 140° F. in a sump of step (i) and further heated in a sparger kiln to approximately 210° F. in said step (ii).

4. A method as claimed in claim 1 wherein said step (iii) comprises injecting said fine particle slurry at a high velocity from under a separating well submerged in a water reservoir to cause an upward flow, obstructing said flow by a plurality of baffles disposed in the flow path to arrest heavier solid particles as said oil particles are floated to the surface, and separately collecting said oil particles and said solid slurry particles.

5. A method as claimed in claim 1 wherein said step (iv) comprises feeding said slurry from under a plurality of cell compartments, feeding an air flow from the bottom of each said compartments, agitating water within each said compartments, adding a foam producing chemical reagent to each said compartments, breaking down said foam floating on the surface of said water and collecting liquid mixture including oil particles floating on the surface of said water.

6. A method as claimed in claim 5 wherein there is further provided the step of collecting solid particles of slurry into a slurry launder at the bottom of said cells to prevent said slurry to be carried away by said foam producing reagent.

7. A method as claimed in claim 1 or 5 wherein said step (vi) comprises injecting said collected liquid mixture downwardly into a water reservoir against a flow dispersing device to break-up and disperse said liquid mixture in said water, injecting a plurality of air streams in the bottom of said water reservoir to carry dispersed oil particles from said liquid mixture to the surface of said water reservoir.

* * * * *